(12) United States Patent
Papari

(10) Patent No.: US 11,361,451 B2
(45) Date of Patent: Jun. 14, 2022

(54) REAL-TIME DETECTION OF PERIODIC MOTION SYSTEMS AND METHODS

(71) Applicant: Teledyne FLIR Commercial Systems, Inc., Goleta, CA (US)

(72) Inventor: Giuseppe Papari, Kortrijk (BE)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 9 days.

(21) Appl. No.: 16/538,680

(22) Filed: Aug. 12, 2019

(65) Prior Publication Data

US 2019/0362507 A1 Nov. 28, 2019

Related U.S. Application Data

(63) Continuation of application No. PCT/US2018/019543, filed on Feb. 23, 2018.

(60) Provisional application No. 62/463,273, filed on Feb. 24, 2017.

(51) Int. Cl.
*G06T 7/254* (2017.01)
*G06F 17/18* (2006.01)
*G06T 5/20* (2006.01)

(52) U.S. Cl.
CPC ............ *G06T 7/254* (2017.01); *G06F 17/18* (2013.01); *G06T 5/20* (2013.01)

(58) Field of Classification Search
CPC . G06T 7/20; G06T 2207/10024; G06T 7/277; G06T 2207/20076; G06T 5/20; G06T 7/254; G06T 2207/30232; G06T 2207/10048; G06F 17/18
See application file for complete search history.

(56) References Cited

U.S. PATENT DOCUMENTS

| | | | | |
|---|---|---|---|---|
| 7,376,282 | B2 * | 5/2008 | Banton | ................ G06T 5/20 358/461 |
| 7,403,638 | B2 | 7/2008 | Jeung et al. | |
| 8,649,562 | B2 | 2/2014 | Haan et al. | |
| 2003/0086596 | A1 * | 5/2003 | Hipp | ............... G06T 7/0012 382/128 |
| 2004/0071337 | A1 * | 4/2004 | Jeung | ................ A61B 6/541 382/151 |
| 2006/0192857 | A1 * | 8/2006 | Kondo | ................ G06T 7/20 348/208.4 |
| 2006/0262958 | A1 | 11/2006 | Yin et al. | |
| 2010/0027846 | A1 | 2/2010 | Ku et al. | |

(Continued)

OTHER PUBLICATIONS

Polana et al., "Recognizing Activities", Pattern Recognition, Conference A: Computer Vision & IM Age Processing, Oct. 9, 1994, pp. 815-818, vol. 1, IEEE.

(Continued)

*Primary Examiner* — Pinalben Patel
(74) *Attorney, Agent, or Firm* — Haynes and Boone, LLP

(57) ABSTRACT

Provided are systems and methods for detecting periodic movement in a video stream. A system includes an imaging module configured to capture video of a scene and a logic device configured to communicate with the imaging module. The logic device is configured to receive a video sequence of the scene from the imaging module, where the received video sequence comprises one or more video regions that are pixel-wise consistent between successive frames of the received video sequence. The logic device is configured to determine a periodicity deviation with respect to at least one of the one or more video regions based, at least in part, on the at least one video region. The logic device may issue an alert based, at least in part, on the determined periodicity deviation.

20 Claims, 9 Drawing Sheets

(56) References Cited

U.S. PATENT DOCUMENTS

| | | | |
|---|---|---|---|
| 2010/0306793 A1 | 12/2010 | Vilei | |
| 2012/0105630 A1* | 5/2012 | Cao | G08B 13/19608 |
| | | | 348/143 |
| 2014/0055350 A1 | 2/2014 | Clarkson | |
| 2014/0376822 A1 | 12/2014 | Holroyd et al. | |
| 2015/0069249 A1 | 3/2015 | Alameh et al. | |
| 2015/0213614 A1* | 7/2015 | Maddah | G06T 7/246 |
| | | | 382/133 |
| 2018/0140376 A1* | 5/2018 | Hokka | A61B 5/7275 |

OTHER PUBLICATIONS

Li et al., "Periodic motion detection with ROI-based similarity measure and extrema-based reference selection," IEEE Transactions on Consumer Electronics, 2012, pp. 947-954, vol. 58, No. 3.

Bay et al., "SURF: Speeded up obust features," Computer Vision and Image Understanding, 2008, pp. 346-359, vol. 110, No. 3.

Swain et al., "Color indexing," International Journal of Computer Vision, 1991, pp. 1033-1043, vol. 1, No. 7.

Cutler et al., "Roust real-time periodic motion detection, analysis and applications," IEEE Transactions on Pattern Analysis an Machine Intelligence, 2000, pp. 781-796, vol. 22, No. 8.

Li et al., "A new approach for hand-waving detection in crowds," Proceedings of the IEEE International conference on Robotics and Biomimetrics, 2013, pp. 2489-2493.

Terabayashi et al., "Detection of small-waving hand by distributed camera system," International conference on Networked Sensing Systems, 2012, pp. 1-5.

Laptev et al., "Periodic motion detection and segmentation via approximate sequence alignment," Proceedings International Conference on Computer Vision, 2005, pp. 816-823 vol. 1.

* cited by examiner

300

400

500

REAL-TIME DETECTION OF PERIODIC MOTION SYSTEMS AND METHODS

CROSS REFERENCE TO RELATED APPLICATIONS

This application is a continuation of International Patent Application No. PCT/US2018/019543 filed Feb. 24, 2018 and entitled "REAL TIME DETECTION OF PERIODIC MOTION SYSTEMS AND METHOD," which is incorporated herein by reference in its entirety.

International Patent Application No. PCT/US2018/019543 filed Feb. 24, 2018 claims priority to and the benefit of U.S. Provisional Patent Application. No. 62/463,273 filed Feb. 24, 2017 and entitled "REAL-TIME DETECTION OF PERIODIC MOTION SYSTEMS AND METHODS," which is hereby incorporated by reference in its entirety.

TECHNICAL FIELD

One or more embodiments of the invention relate generally to detection of movement, and more particularly, for example, to near real-time detection of periodic movement in a video stream.

BACKGROUND

Video surveillance has made considerable advancements over the past few decades as the proliferation of digital cameras and the internet of things have evolved. A majority of businesses are now monitored by security cameras, and people are increasingly installing cameras in and around their homes to monitor their property and family. A majority of these systems go unmonitored in real time, and are primarily used to investigate after-the-fact observed aberrations in a user's daily routine. This process is time intensive and exceedingly inefficient.

In more recent years, video surveillance systems have implemented various forms of motion detection recording and alerts so that the review process time is more focused and efficient. Integrating motion detection has allowed alerts to be detected and sent to users when the system detects movement captured by one of the cameras in a surveillance system. However, contemporary alert detection systems suffer from many problems.

Of primary concern, by detecting and triggering an alert based on arbitrary movement in the image capture region, many false alarms are reported. For example, a tree blowing in the wind in an image capture region could repeatedly trigger an unwanted alert. After a few too many false alarms, a user may decide to terminate the motion detection feature or simply ignore the repeated alerts. Some systems have sought to remedy this problem by allowing a user to select portions of the camera's viewing area and only triggering an alert when motion is detected in those user selected motion detection areas, but the user risks not being alerted to potentially triggering events that are outside those designated areas. Moreover, the same false alert problems exist within each selected motion detection areas; namely that any arbitrary movement will trigger an alert. Other conventional methods of preventing false alerts include requiring motion over a period of time or providing a black out period after an alert, but both of these methods risk missing important triggering events. Thus, conventional motion detection systems remain highly prone to false alerts (and users deactivating or ignoring alerts due to the relatively poor alert reliability) and false negative alerts.

Accordingly, there exists a need in the art for a reliable and near real-time detection methodology that can reduce risk of false detections and false negative detections in a video stream.

SUMMARY

Provided is a methodology for detecting periodic movement in a video stream. Embodiments provide for an efficient, adaptive method of evaluating periodic movement that can be performed in near real-time and that can generate corresponding alerts for distribution to one or more monitoring users or for further processing. Embodiments provide reliable detection of and differentiation between different types of periodic motion, such as detection of a human waving their hands or arms to signal for help, as differentiated from a pets wagging tail, as described in detail herein.

In one embodiment, a system includes an imaging module configured to capture video of a scene and a logic device configured to communicate with the imaging module. The logic device may be configured to receive a video sequence of the scene from the imaging module, where the received video sequence comprises one or more video regions that are pixel-wise consistent between successive frames of the received video sequence; determine a periodicity deviation with respect to at least one of the one or more video regions based, at least in part, on the at least one video region; and issue an alert based, at least in part, on the determined periodicity deviation.

In another embodiment, a method includes receiving a video sequence of a scene from an imaging module, where the received video sequence comprises one or more video regions that are pixel-wise consistent between successive frames of the received video sequence; determining a periodicity deviation with respect to at least one of the one or more video regions based, at least in part, on the at least one video region; and issuing an alert based, at least in part, on the determined periodicity deviation.

Embodiments of the invention and their advantages are best understood by referring to the detailed description that follows. It should be appreciated that like reference numerals are used to identify like elements illustrated in one or more of the figures.

DETAILED DESCRIPTION

Embodiments described herein present systems and methods for detecting periodic motion in video sequences and issuing alerts or alarms upon detection of the periodic motion, such as a person waving arms or hands asking for help. The video sequence may comprise visual spectrum image data, infrared image data, and/or other spectrum or combination of spectrum image data, for example, selected to emphasize or facilitate detection of periodic motion under a particular context or for a particular application. Embodiments may be used for security applications, for example, and in particular for elderly people who live alone at home or at a facility built to provide housing for the elderly. In the event a person needs help, they can wave their arms, hands, or other appendages, or move portions of their face or other portions of their body, and embodiments described herein can detect the motion, differentiate it from false positive motions (e.g., movement of pets or foliage), and issue an alert or alarm so that a nurse or family member can provide help. More generally, embodiments may be configured to detect specific ranges of periodic motion corresponding to a particular type of event, object motion, or deviation from expected motion, for example, and issue a reliable corresponding alert.

Figure 7:
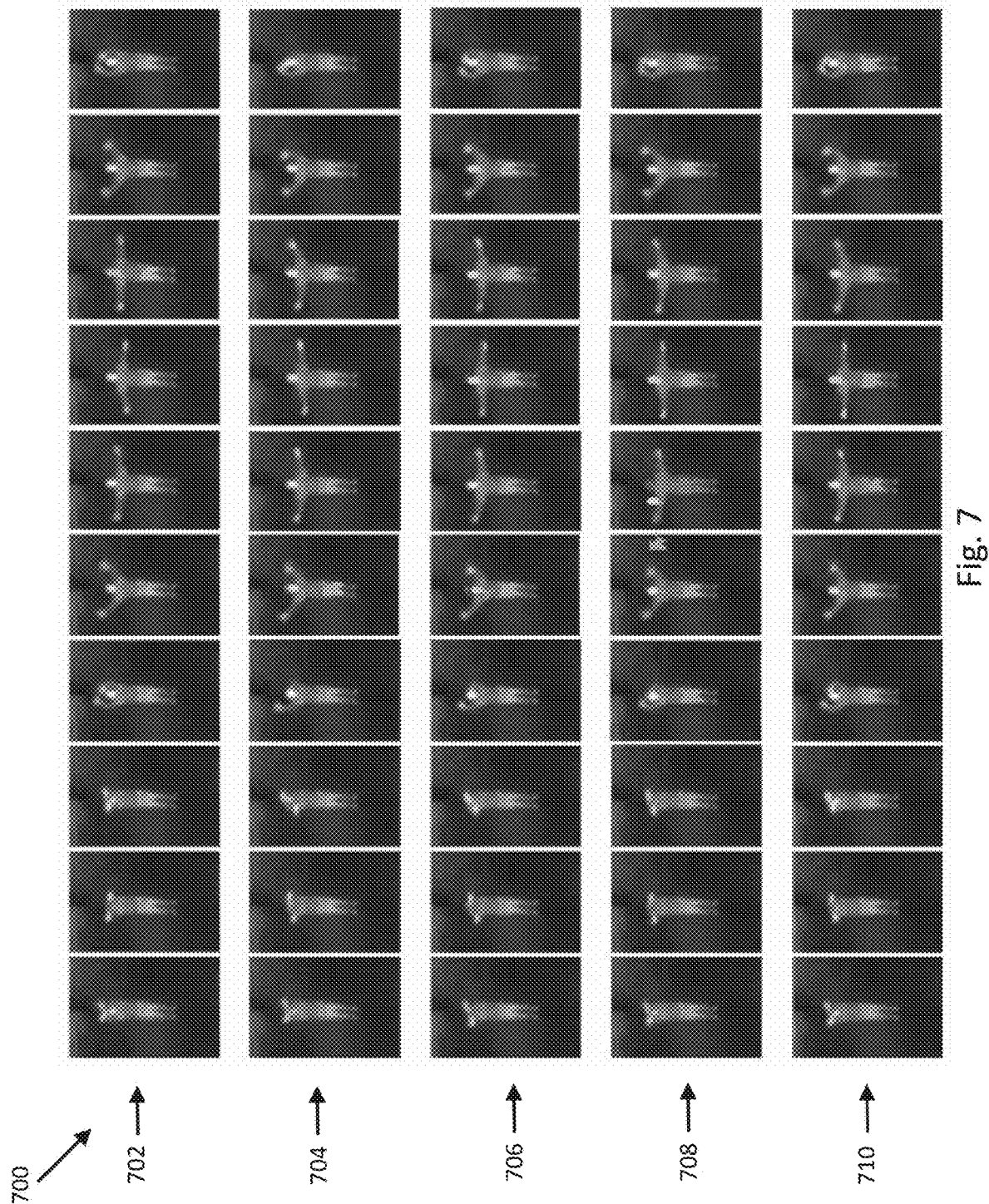
FIG. 7 illustrates fifty consecutive frames of an infrared video sequence arranged in frame series that portray a person waving both arms as a form of periodic motion, in accordance with an embodiment of the disclosure.

Embodiments of the present disclosure have the following appealing properties: a very high rate of correctly detected events (e.g., approaching 100% in a large variety of different scenarios, such as waving either one or both hands, different postures, different distances from the camera, noise, and other different scenarios); a very efficient implementation in terms of both computation time and memory usage; and a relatively low response time, on the order of few seconds. For example, experiments show that a person waving their hands results in periodic motion. An example is illustrated in FIG. 7, which includes fifty consecutive frames of a video sequence (e.g., infrared image data, 40×60 pixels, at 9 frames per second, for a total of approximately 5.5 seconds) arranged in five different frame series 702-710 that portray a person waving both their arms as a form of periodic motion. As we see, video sequence 700 repeats almost identically every ten frames (1.11 s), as shown by comparing frame series 702-710 vertically, which suggests that the motion of a person waving their arms can be highly periodic. As such, embodiments are provided that can reliably detect such motion by detecting periodic motion whose frequency is within an acceptable or typical range, as described more fully herein.

For example, embodiments of the present disclosure can exploit the fact that the gesture of waving arms can be highly periodic in time, and provide a reliable and robust detector for periodic motion based on normalized integrated Euclidean distances between frames in a video sequence. The method can be implemented recursively, can be configured for extremely lightweight computation and memory usage, and can be highly parallelizable/vectorizable, thus making it suitable for implementations in embedded systems. Moreover, unlike conventional methods, embodiments are able to provide these benefits while reliably identifying a relatively narrow region of the image where the detected periodic motion is located.

Figure 1:
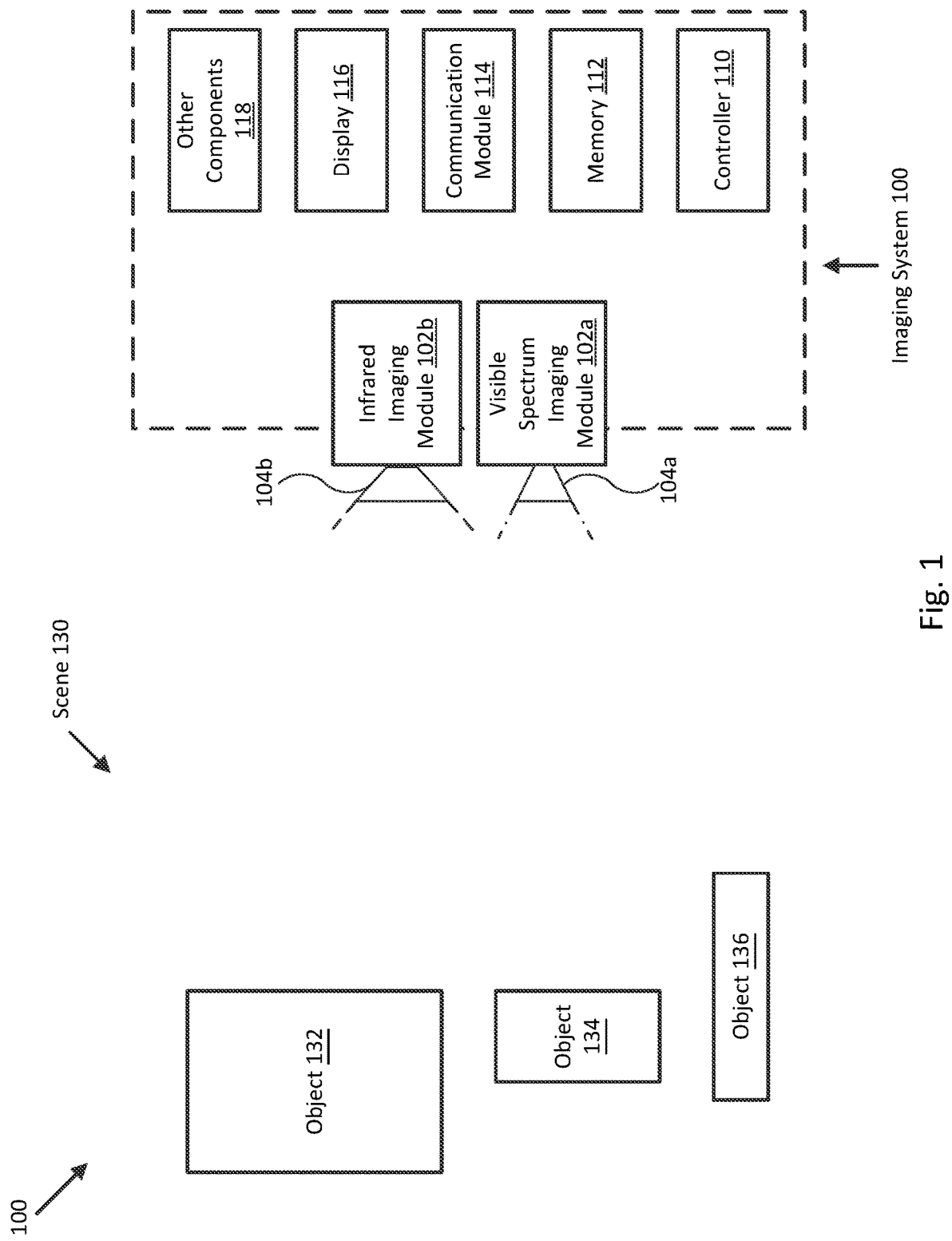
FIG. 1 illustrates a block diagram of an imaging system configured to detect periodic motion in a scene, in accordance with an embodiment of the disclosure.

Referring now to FIG. 1, FIG. 1 illustrates a block diagram of imaging system 100 configured to detect periodic motion in scene 130, in accordance with an embodiment of the disclosure. System 100 may include one or more imaging modules, such as visible spectrum imaging module 102*a* and/or infrared imaging module 102*b*, controller 110, memory 112, communication module 114, display 116, and/or other components 118. Where appropriate, elements of system 100 may be implemented in the same or similar manner as other devices and systems described herein.

As shown in FIG. 1, scene 130 (e.g., illustrated as a top plan view) may include various objects, such as object 132, object 134, and object 136. Object 132, object 134, object 136 may be imaged by either or both visible spectrum imaging module 102*a* and/or infrared imaging module 102*b*. Object 132, object 134, and/or object 136 may correspond to one or more people, mechanical systems, vehicles, processing plants, gas handling systems, and/or other objects that may produce periodic motion or image data that can be sensed by imaging modules of imaging system 100. Such periodic motion may include one or more types of biological periodic motion, such as waving appendages, flexing fingers, toes, or other appendages, facial movements, vocalizations (e.g., as hot or humid breath detection) or related motion, tail wagging, insect flight, and/or other biological periodic motion. Such periodic motion may also include mechanical periodic motion (e.g., reciprocating motion, rotations, and/or other mechanical periodic motions), gas handling periodic motion (e.g., periodic gas exhaust, temperature fluctuations, and/or other gas handling related periodic motions), and/or other periodic motions that can be tied to a particular desired detected event.

In some embodiments, imaging system 100 can be configured to combine visible spectrum images from visible spectrum imaging module 102*a* with infrared images from infrared imaging module 102*b* in order to generate combined images including radiometric data and/or other infrared characteristics corresponding to scene 130 but with significantly more object detail and/or contrast than typically provided by the infrared or visible spectrum images alone. In other embodiments, the combined images can include radiometric data corresponding to one or more objects within scene 130, for example, and visible spectrum characteristics, such as a visible spectrum color of the objects, for example. In some embodiments, both the infrared images and the combined images can be substantially real time images or video (e.g., video sequences) of scene 130. In each embodiment, visible spectrum images including predominately certain elements of scene 130, such as object 132, object 134, and object 136, can be processed to provide visible spectrum characteristics that, when combined with infrared images, allow easier recognition and/or interpretation of the combined images.

Visible spectrum imaging module 102*a* may be implemented as any type of visible spectrum camera or imaging device capable of imaging at least a portion of scene 130 in the visible spectrum. In some embodiments, visible spectrum imaging module 102*a* may be a small form factor visible spectrum camera or imaging device. For example, in some embodiments, imaging module 102*a* may be implemented with a charge-coupled device (CCD) sensor, an electron multiplying CCD (EMCCD) sensor, a complementary metal-oxide-semiconductor (CMOS) sensor, a scientific CMOS (sCMOS) sensor, or other sensors.

Visible spectrum imaging module 102a may include an FPA of visible spectrum sensors, for example, and may be configured to capture, process, and/or manage visible spectrum images or video sequences of scene 130. Visible spectrum imaging module 102a may be configured to store and/or transmit captured visible spectrum images or video sequences according to a variety of different color spaces/formats, such as YCbCr, RGB, and YUV, for example, and individual visible spectrum images or video sequences may be color corrected and/or calibrated according to their designated color space and/or particular characteristics of visible spectrum imaging module 102a.

Infrared imaging module 102b may be an infrared camera or imaging device configured to capture, process, and/or manage infrared images or video sequences, including thermal images or video sequences, of at least portions of scene 130. For example, infrared imaging module 102b may include an FPA of microbolometers, quantum well infrared photodetectors, strained lattice infrared photodetectors, and/or other infrared sensitive sensors implemented in accordance with various embodiments disclosed herein or otherwise where appropriate. Infrared imaging module 102b may be configured to store and/or transmit captured infrared images or video sequences according to a variety of different color spaces/formats, such as YCbCr, RGB, and YUV, for example, where radiometric data may be encoded into one or more components of a specified color space/format. In some embodiments, a common color space may be used for storing and/or transmitting infrared images or video sequences and visible spectrum images or video sequences.

Imaging modules 102a-b may be mounted so that at least a portion of scene 130 is within a shared field of view (FOV) of imaging modules 102a-b. In various embodiments, imaging modules 102a-b may include respective optical elements 104a-b (e.g., visible spectrum and/or infrared transmissive lenses, prisms, reflective mirrors, fiber optics) that guide visible spectrum and/or infrared radiation from scene 130 to sensors (e.g., FPAs) of imaging modules 102a-b. Such optical elements may be used when mounting an imaging module at a particular FOV-defined location is otherwise difficult or impossible. Such optical elements may also be used to suitably define or alter an FOV of an imaging module. A switchable FOV (e.g., selectable by a corresponding imaging module and or controller 110) may optionally be provided to provide alternating far-away and close-up views of a portion scene 130, for example, or to provide focused and de-focused views of scene 130.

In some embodiments, one or more of visible spectrum imaging module 102a and/or infrared imaging module 102b may be configured to be panned, tilted, and/or zoomed to view the surrounding environment in any desired direction (e.g., any desired portion of scene 130 and/or other portions of the environment). For example, in some embodiments, visible spectrum imaging module 102a and/or infrared imaging module 102b may be pan-tilt-zoom (PTZ) cameras that may be remotely controlled, for example, from appropriate components of imaging system 100.

In some embodiments, it is contemplated that at least one of imaging modules 102a/102b may capture an image or video sequence of a relatively large portion of scene 130, and at least another one of imaging modules 102a/102b may subsequently capture another image or video sequence of a smaller subset of the scene 130 (e.g., to provide an image or video sequence of an area of interest of scene 130). For example, it is contemplated that a visible spectrum or infrared image or video sequence of a large portion of scene 130 may be captured, and that an infrared or visible spectrum image or video sequence of a subset of scene 130 may be captured and overlaid, blended, and/or otherwise combined with the previous image or video sequence to permit a user to selectively view visible spectrum and/or infrared image or video sequence portions of the subset of scene 130 as may be desired.

Infrared images or video sequences captured, stored and/or transmitted by imaging module 102b may be stored, transmitted and/or processed by one or more of imaging module 102b and controller 110 in a variety of color spaces, for example, such as YCbCr, RGB, YUV, and other known or proprietary color spaces. In some embodiments, radiometric data corresponding to a measurement of infrared emissions impinging upon an infrared sensor or FPA of infrared sensors may be encoded into one or more components of an infrared image. For example, where a designated color space for an infrared image or video sequence is YCbCr, radiometric data captured by infrared imaging module 102b may be encoded into a luminosity component (e.g., Y) of the infrared image or video sequence. In a related embodiment, a corresponding chrominance component (e.g., Cr and Cb) of the infrared image or video sequence may be eliminated, truncated, and/or unused, for example, or may be set to a particular known value, such as grey or a combination of one or more primary colors.

In other embodiments, radiometric data may be encoded into a chrominance component (e.g., Cr and Cb) of a corresponding infrared image or video sequence while a luminance component (e.g., Y) is set to a particular known value, such as a mid-level value. For example, a range of radiometric data may be encoded into a range of a single primary color, for instance, or may be encoded into a range of a combination of primary colors. In one embodiment, encoding radiometric data into one or more primary colors may include applying a pseudo-color palette to the radiometric component of an infrared image.

In further embodiments, radiometric data may be encoded into both luminance and chrominance components of an infrared image or video sequence (e.g., Y and Cr and Cb). For example, infrared imaging module 102b may be adapted to sense infrared radiation across a particular band of infrared frequencies. A luminance component may include radiometric data corresponding to intensity of infrared radiation, and a chrominance component may include radiometric data corresponding to what frequency of infrared radiation is being sensed (e.g., according to a pseudo-color palette). In such an embodiment, a radiometric component of the resulting infrared image may include both luminance and chrominance components of the infrared image or video sequence.

In still further embodiments, infrared images or video sequences captured by infrared imaging module 102b may be stored according to a module-specific color space, for example, and be stored as raw radiometric data (e.g., uncompressed) for each pixel of infrared imaging module 102b. In some embodiments, a radiometric component of the resulting infrared image or video sequence may include the raw radiometric data, and one or more of imaging modules 102a-b and/or controller 110 may be configured process the raw radiometric data to generate combined images or video sequences including infrared characteristics of scene 130.

Infrared images or video sequences captured, processed, and otherwise managed by infrared imaging module 102b may be radiometrically normalized infrared images (e.g., thermal images). Pixels that make up a captured image or video sequence may contain calibrated thermal data (e.g., absolute temperatures). Infrared imaging module 102b and/or associated components may be calibrated using appropriate techniques so that images or video sequences captured by the infrared imaging module are properly calibrated infrared images or video sequences. In some embodiments, appropriate calibration processes may be performed periodically by infrared imaging module 102b and/or controller 110 so that the infrared imaging module and its captured infrared images or video sequences maintain accurate calibration. In other embodiments, infrared imaging module 102b and/or controller 110 may be configured to perform other processes to emphasize a desired range or interval of radiometric data, for example, and allocate a dynamic range of one or more components of a resulting infrared image or video sequence according to the desired range of radiometric data. Thus, a radiometric component of an infrared image may include calibrated radiometric data, un-calibrated radiometric data, and/or adjusted radiometric data.

Controller 110 may be implemented as any appropriate logic device or processing device. In some embodiments, controller 110 may be part of or implemented by other conventional processors and control electronics of a monitoring system monitoring scene 130. For example, a monitoring system for scene 130 may include one or more processors or control electronics for controlling alarms, processing image or video data, and/or notifying various users, any of which may be used to implement all or part of controller 110. In other embodiments, controller 110 may interface and communicate with such other control electronics and processors as well as any monitoring system components associated with such processors. In some embodiments, controller 110 may be configured to control, monitor, and or communicate with lights, animated signs, or sirens in or near scene 130, for example, and in some embodiments, do so according to a schedule set by a user, a technician, or by default at a factory. Such schedule may determine whether a particular notification or type of notification or alert is provided to a user, for example, or to determine when one or more monitoring system components are enabled.

Controller 110 may be configured to interface and communicate with other components of system 100 to perform methods and processes described herein, including to provide control signals to one or more components of a monitoring system monitoring scene 130. Controller 110 may be configured to receive visible spectrum and/or infrared (e.g., thermal) images or video sequences of at least a portion of scene 130 captured by imaging modules 102a-b, perform image processing operations as further described herein, and issue alerts and/or generate combined images from the captured images to, for example, provide high resolution, high contrast, or targeted contrast combined images of portions of and/or objects in scene 130. Controller 110 may also be configured to compile, analyze, or otherwise process visible spectrum images or video sequences, infrared images or video sequences, and context data (e.g., time, date, environmental conditions) to generate monitoring information about scene 130, such as monitoring information about detected objects in scene 130.

For example, controller 110 may receive a video sequence of scene 130 from imaging modules 102a/102b. The received video sequence may include one or more predetermined video regions that are pixel-wise consistent (e.g., the same pixel size and placement within frames) between successive frames of the received video sequence. Controller 110 may determine a periodicity deviation relative to a preselected period for at least one of the one or more video regions and issue an alert based on the determined periodicity deviation and, for example, a periodicity deviation threshold, as described more fully herein. Accordingly, controller 110 may be configured to implement a periodic motion detector, as described herein.

Controller 110 may also generate monitoring information that includes, for example, a temperature reading based on a determined temperature, determine whether the temperature of an object is within a typical operating temperature range, and generate monitoring information that includes a notification or alarm indicating the temperature is outside a typical range. In another example, controller 110 may perform various image processing operations and image analytics on visible spectrum, infrared, and/or combined images or video sequences of scene 130 to detect transitory objects entering scene 130. Based on the detection, controller 110 may generate monitoring information that includes an alarm or other visual or audible notifications that indicate arrival of a transitory object.

In some embodiments, controller 110 may be configured to convert visible spectrum, infrared, and/or combined images or video sequences of portions of power system 130 into user-viewable images or video sequences (e.g., thermograms) using appropriate methods and algorithms. For example, thermographic data contained in infrared and/or combined images or video sequences may be converted into gray-scaled or color-scaled pixels to construct images or video sequences that can be viewed on a display. Such conversion may include adjusting a dynamic range of one or more components of the combined images or video sequences to match a dynamic range of display 116, for example, to emphasize a particular radiometric interval, and/or to increase a perceived contrast of user-viewable images or video sequences. User-viewable images or video sequences may optionally include a legend or scale that indicates the approximate temperature of a corresponding pixel color and/or intensity. Such user-viewable images or video sequences, if presented on a display (e.g., display 116), may be used to confirm or better understand conditions of scene 130 detected by system 100. Monitoring information generated by controller 110 may include such user-viewable images or video sequences.

Memory 112 may include one or more memory devices (e.g., memory components) to store data and information, including visible spectrum, infrared, and/or combined images or video sequences, context data, and monitoring information. The memory devices may include various types of memory for image and other information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, images, video sequences, context data, and monitoring information stored in the memory devices may be retrieved (e.g., by a user) for purposes of reviewing and further diagnosing a detected condition of scene 130 or refining a method of generating combined images from captured visible spectrum and infrared images or video sequences. In another embodiment, memory 112 may include a portable memory device that can be removed from system 100 and used to convey stored data to other systems, including monitoring systems, for further processing and inspection. In some embodiments, controller 110 may be configured to execute software instructions stored on memory 112 and/or machine readable medium 193 to perform various methods, processes, or operations in the manner described herein.

Display 116 may be configured to present, indicate, or otherwise convey images or video sequences and/or monitoring information generated by controller 110. In one embodiment, display 116 may be implemented with various lighted icons, symbols, indicators, and/or gauges which may be similar to conventional indicators, gauges, and warning lights of a conventional monitoring system. The lighted icons, symbols, and/or indicators may indicate one or more notifications or alarms associated with images or video sequences and/or monitoring information. The lighted icons, symbols, or indicators may also be complemented with an alpha-numeric display panel (e.g., a segmented LED panel) to display letters and numbers representing other monitoring information, such as a temperature reading or a description or classification of detected conditions.

In various embodiments, display 116 may be implemented with an electronic display screen, such as a liquid crystal display (LCD), a cathode ray tube (CRT), or various other types of generally known video displays and monitors, including touch-sensitive displays. Display 116 may be suitable for presenting user-viewable visible spectrum, infrared, and/or combined images or video sequences retrieved and/or generated by controller 110 from images or video sequences captured by imaging modules 102*a-b*. It is contemplated that conventional monitoring system display screens may be utilized as display 116.

Communication module 114 may be configured to facilitate communication and interfacing between various components of system 100. For example, elements such as imaging modules 102*a-b*, display 116, and/or other components 118 may transmit and receive data to and from controller 110 through communication module 114, which may manage wired and/or wireless connections (e.g., through proprietary RF links, proprietary infrared links, and/or standard wireless communication protocols such as IEEE 802.11 WiFi standards and Bluetooth™ between the various components. Such wireless connections may allow imaging modules 102*a-b* to be mounted where it would not be convenient to provide wired connections, for example.

Communication module 114 may be further configured to allow components of system 100 to communicate and interface with other components of a monitoring system monitoring scene 130. For example, controller 110 may communicate, via communication module 114, with a motion detector, smoke detector, and other existing sensors and electronic components. In this regard, communication module 114 may support various interfaces, protocols, and standards for networking, such as the controller area network (CAN) bus, the local interconnect network (LIN) bus, the media oriented systems transport (MOST) network, or the ISO 11738 (or ISO bus) standard. Furthermore, communication module 114 may be configured to send control signals generated by controller 110 using these interfaces and protocols.

In some embodiments, system 100 may include a number of communication modules 114 adapted for various applications of system 100 with respect to various types of scenes. In other embodiments, communication module 114 may be integrated into or implemented as part of various other components of system 100. For example, imaging modules 102*a-b*, controller 110, and display 116 may each comprise a subcomponent that may be configured to perform the operations of communication module 114, and may communicate with one another via wired and/or wireless connections without a separate communication module 114.

Other components 118 may include, in some embodiments, other sensors such as a temperature sensor (e.g., a thermocouple, an infrared thermometer), a moisture sensor, an electrical sensor (e.g., a volt/current/resistance meter), a pressure sensor (e.g., a barometer), a visible spectrum light meter, and/or a microphone. Data from sensors such as a temperature, moisture, pressure, or light sensor may be utilized by controller 110 to detect and potentially compensate for environmental conditions (e.g., fog, smoke, or other low-light condition), and thereby obtain more accurate or more easily interpretable combined images or video sequences and derived conditions of scene 130.

Other components 118 may also include any other device as may be beneficial for various applications of system 100. In some embodiments, other components 118 may include a chime, a speaker with associated circuitry for generating a tone, or other devices that may be used to sound an audible alarm or notification based on images or video sequences processed by controller 110. In further embodiments, other components 118 may include a user interface to accept user input of, for example, a periodicity deviation threshold, a periodicity library database, selection/identification of a region or plurality of regions of a video sequence captures by imaging modules 102*a-b*, a desired method of generating combined images, a target contrast or corresponding radiometric interval and/or dynamic range, a notification setting of system 100, external sensor data, or context information.

In various embodiments, one or more components of system 100 may be combined and/or implemented or not, depending on application requirements. For example, controller 110 may be combined with any of imaging modules 102*a-b*, memory 112, display 116, and/or communication module 114. In another example, controller 110 may be combined with any of imaging modules 102*a-b* with only certain operations of controller 110 performed by circuitry (e.g., a processor, logic device, microprocessor, microcontroller, etc.) within any of the infrared imaging modules. Thus, one or more components of system 100 may be mounted in view of scene 130 to provide real-time and/or enhanced infrared monitoring of scene 130.

Figure 2:
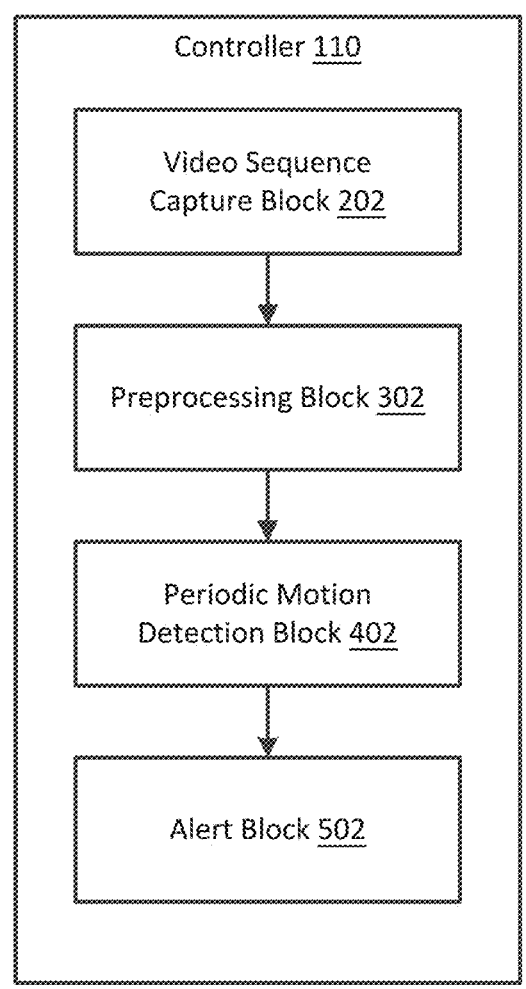
FIG. 2 illustrates a block diagram of a controller configured to perform periodic motion detection, in accordance with an embodiment of the disclosure.

FIG. 2 illustrates a block diagram 200 of controller 110 configured to perform periodic motion detection, in accordance with an embodiment of the invention. As shown in the embodiment presented by FIG. 2, controller 110 includes a video sequence capture block 202, a preprocessing block 302, a periodicity determination block 402, and an alert block 502. Each of blocks 202, 302, 402, and/or 502 may be implemented by any combination of software instructions and/or electronic hardware (e.g., inductors, capacitors, amplifiers, actuators, cameras, or other analog and/or digital components) configured to perform the functions described herein, some or all of which may be implemented by or within controller 110. In general, block diagram 200 illustrates controller 110 capturing a video sequence of a scene (block 202), optionally preprocessing the captured video sequence to reduce noise and facilitate periodic motion detection (block 302), processing the captured video sequence to determine periodicity deviation in the captured video sequence (block 402), and issuing an alert based on the corresponding detected periodic motion (block 502).

In video sequence capture block 202, a video sequence comprising a temporal series image frames is captured, such as by imaging modules 102*a* and/or 102*b*, and received by controller 110. As used herein, such video sequence may be represented analytically by $I(x, y, t)$. In some embodiments, video sequence capture block 202 may be configured to use infrared imaging module 102*b* to capture infrared video sequences. In various embodiments, video sequence capture block 202 may be configured to use an imaging module sensitive to other electromagnetic radiation bands to capture corresponding video sequences, such as a visible spectrum, infrared, ultraviolet, or other spectrums of radiation. It some embodiments, video sequence capture block 202 may be configured to use multiple different types of imaging modules to capture and/or form multi-spectral video sequences, multiple video sequences, or composite video sequences, for example, that are then received by controller 110.

Figure 3:
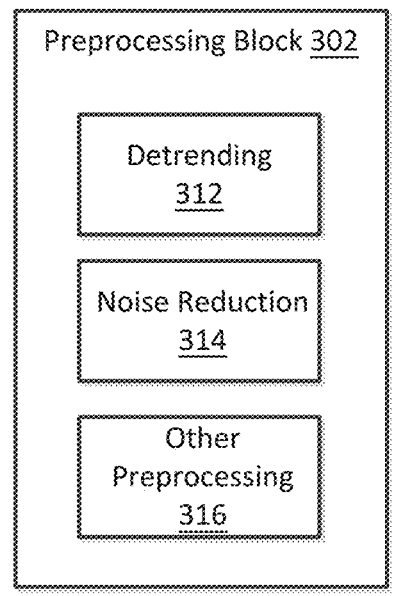
FIG. 3 illustrates a block diagram of a preprocessing block to facilitate periodic motion detection, in accordance with an embodiment of the disclosure.

In optional preprocessing block 302, the video sequence captured in block 202 is preprocessed to facilitate detection of periodic motion in block 400. For example, FIG. 3 illustrates a block diagram 300 of preprocessing block 302 to facilitate periodic motion detection, in accordance with an embodiment of the disclosure. In various embodiments, preprocessing block 302 includes a de-trending block 312, a noise reduction block 314, and/or optional other preprocessing block 316.

De-trending block 312 may be implemented by software instructions and/or hardware configured to compensate for global temporal trends of pixel values in video sequences, and particularly in video sequences captured by infrared cameras imaging modules (e.g., sensitive to thermal IR radiation, or one or more of near IR, short-wave IR, mid-wave IR, long-wave IR, and far IR radiation), primarily caused by various types of imaging corrections that such imaging modules perform internally (e.g., automatic gain correction, non-uniformity correction, thermal calibration, and/or other imaging corrections). Global temporal trend artifacts can reduce the reliability of periodic motion detection, as described herein, and so de-trending block 312 may be used to reduce or substantially eliminate such artifacts.

Figure 6:
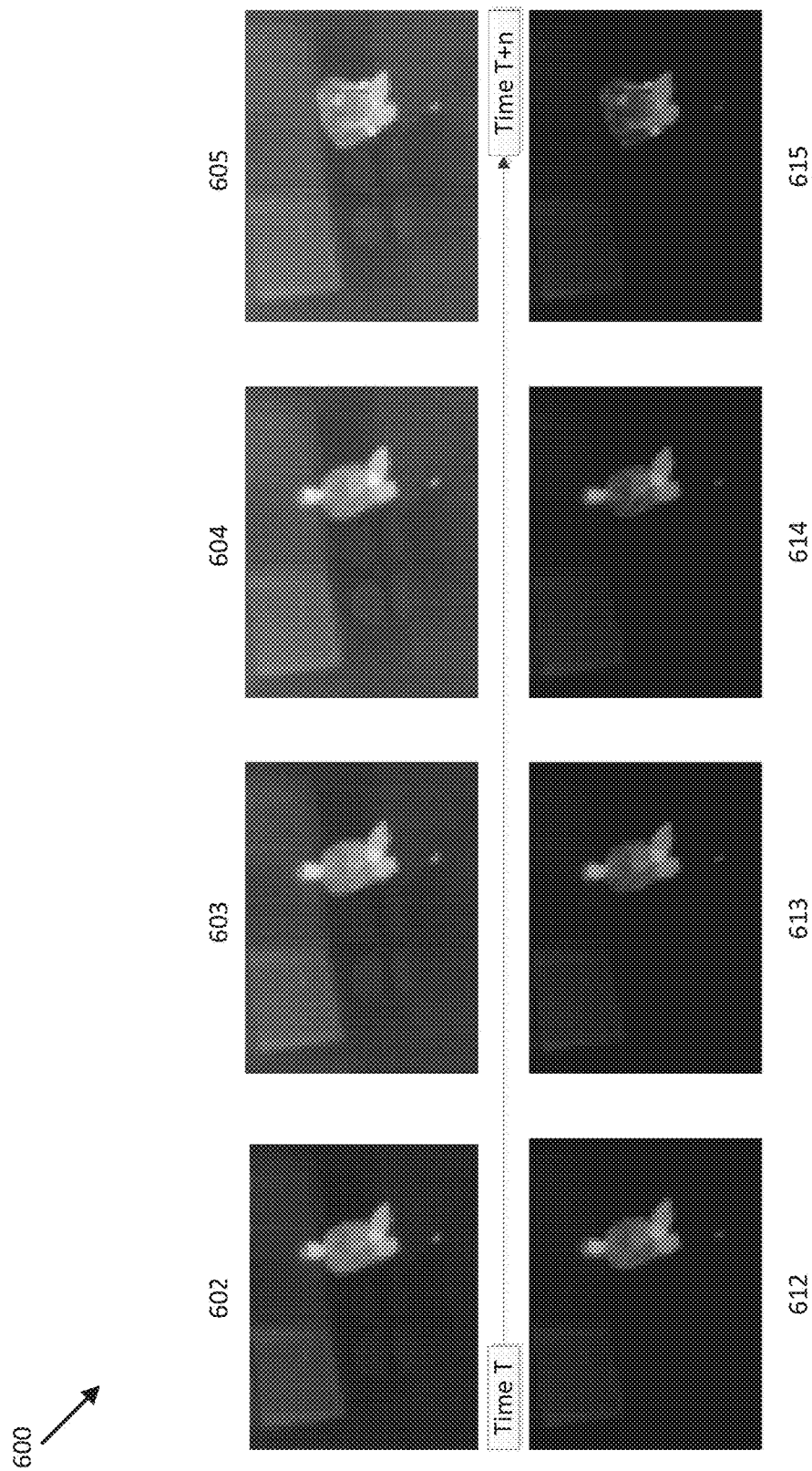
FIG. 6 illustrates a comparison of a first video sequence including a global temporal trend against a second video sequence with the global temporal trend removed by de-trending, in accordance with an embodiment of the disclosure.

For example, FIG. 6 illustrates a comparison 600 of a first video sequence (e.g., frames 602-605) including a global temporal trend against a second video sequence (e.g., frames 612-615) with the global temporal trend removed by de-trending, in accordance with an embodiment of the disclosure. As shown in FIG. 6, frames of input video sequence 602-605 become progressively lighter due to temporal trending from Time T to Time T+n. Frames of output video sequence 612-615 show the result of applying de-trending (e.g., implemented within an embodiment of de-trending block 312) to input video sequence 602-605, in which the global increase over time of pixel values of input video sequence 602-605 has been substantially eliminated.

In some embodiments, de-trending block 312 may be configured to determine a spatial average of a received video sequence and de-trend the received video sequence by subtracting the determined spatial average from each frame of the received video sequence. In particular embodiments, such processing may be implemented according to Equation (1):

$$u(x, y, t) = I(x, y, t) - \frac{1}{|\Omega|} \int \int_\Omega I(x, y, t) dx dt \quad (1)$$

where $I(x, y, t)$ represents a received video sequence or signal, $u(x, y, t)$ represents an output de-trended video sequence or signal, and $|\Omega|$ is the area of domain $\Omega$ (e.g., the spatial extent of the video sequence). In various embodiments, such de-trending may occur before or after application of noise reduction block 314, but typically occurs prior to operation of periodic motion detection block 402. In general, de-trending may be applied to image data from various types of imaging modules to correct shifting pixel values or other artifacts.

Noise reduction block 314 of FIG. 3 may be implemented by software instructions and/or hardware configured to reduce noise and high frequency content in video sequences. Detection of periodic motion can be negatively affected by the presence of noise and small deviations from periodicity that occurs at high scales. Both can be reduced by application of a low pass filter, and in particular, a linear low pass filter, implemented by or within noise reduction block 314. In various embodiments, such low pass filter may be implemented according to $v(x, y, t)=u(x, y, t)*L(x, y)$, where $v(x, y, t)$ represents the input video sequence, $u(x, y, t)$ represents the output filtered video sequence, and $L(x, y)$ represents a low pass filter. In particular embodiments, the low pass filter may be implemented by a separable two dimensional Bernoulli filter $L(x, y)=B_N(x)B_N(y)$, shown as Equation (2):

$$B_N(n) = \frac{1}{2^{2N}} \binom{2N}{N+n} \approx \frac{1}{\sqrt{N\pi e}} e^{\frac{-n^2}{N}}, -N \leq n \leq N. \quad (2)$$

Equation (2) is one approximation of a Gaussian filter, with the advantage that it can be implemented more efficiently by only using integer arithmetic rather than floating point operations as typically required by an exact Gaussian filter. In particular, the binomial coefficients $$\binom{2N}{N+n}$$

may be computed offline and stored for relatively fast look up, and the multiplication with factor $$\frac{1}{2^{2N}}$$

may be implemented as a bit shift (e.g., rightward) of all bits by 2N positions, which may be performed at the end of the convolution.

Other preprocessing block 316 of FIG. 3 may be implemented by software instructions and/or hardware configured to perform operations separate from de-trending block 312 and/or noise reduction block 314 to prepare a video sequence for delivery to periodic motion detection block 402 and facilitate operation of periodic motion detection block 402. In various embodiments, other preprocessing block 316 may be configured to perform non-uniformity correction operations, gain correction operations, row and/or column noise reduction operations, and/or other preprocessing operations configured to increase the reliability of periodic motion detection, as described herein.

Figure 4:
FIG. 4 illustrates a block diagram of a periodic motion detection block to determine periodicity deviations in a video sequence, in accordance with an embodiment of the disclosure.
Figure 4:
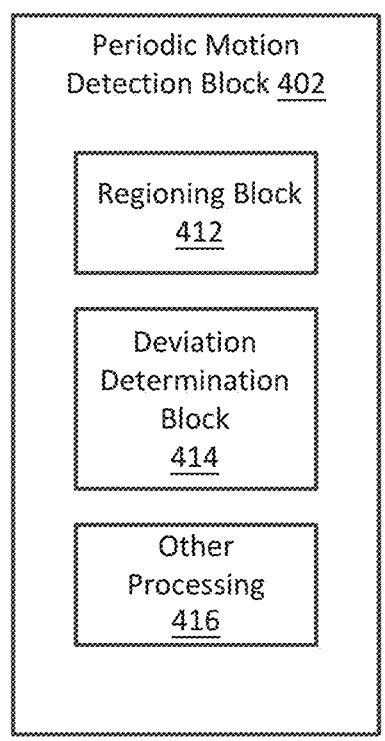

In periodic motion detection block 402 of FIG. 2, the video sequence captured in block 202 (and optionally preprocessed in block 302) is processed to detect periodic motion in the captured video sequence by determining periodicity deviations in the captured video sequence. For example, FIG. 4 illustrates a block diagram 400 of periodic motion detection block 402 to determine periodicity deviations in a video sequence, in accordance with an embodiment of the disclosure. In various embodiments, periodic motion detection block 402 includes a regioning block 412, a deviation determination block 414, and/or optional other processing block 416 configured to facilitate near real-time detection of periodic movement in a video sequence. More particularly, periodic motion detection block 402 may be configured to leverage a metric that measures the local deviation of a given video sequence from a periodic video sequence to detect periodic motion in a video sequence, and embodiments provided herein may employ recursive techniques to implement and apply the metric efficiently to a received video sequence or series of video sequences.

A video sequence I(x, y, t) defined on pixel region Ω is T-periodic (e.g., periodic with period T) if I(x, y, t)=I(x, y, t+T) is true for every (x, y, t). The deviation of I(x, y, t) from T-periodicity may be represented by the following normalized Euclidean norm:

$$\delta_T^2(t) = \frac{\frac{1}{2}\int_0^T \int_\Omega [I(x, y, t-\tau) - I(x, y, t-\tau-T)]^2 dxdyd\tau}{\int_0^T \int_\Omega I^2(x, y, t-\tau)^2 dxdyd\tau + \int_0^T \int_\Omega I^2(x, y, t-\tau-T)^2 dxdyd\tau} \quad (3)$$

In (3), the lower the value of $\delta_T^2(t)$, the less that I(x, y, t) deviates from T-periodicity. $\delta_T^2(t)$ (e.g., referred to herein as the normalized periodicity deviation) will return values from 0 to 1, with zero being returned only when signal I(x, y, t) is purely periodic; i.e. I(x, y, t)=I(x, y, t+T) for every (x, y, t). From (3), $\delta_T^2(t)$ is scale invariant in both the spatial and grey level domain; replacing I(x, y, t) with αI(βx, βy, t) does not change the value of $\delta_T^2(t)$. However, $\delta_T^2(t)$ is not translation invariant in the grey level domain, which can negatively impact the ability of the metric represented by (3) to reliably detect periodicity across a variety of different and/or time-separated video sequences and sources. To explain, given any non-periodic signal I(x, y, t), the value of $\delta_T^2(t)$ can be made arbitrarily small by replacing I(x, y, t) with I(x, y, t)+ku(x, y,) where u(x, y) is an arbitrary two dimensional profile, and k>>1 is an arbitrarily large constant. Folding such replacement into (3), the numerator of (3) is independent of k, the denominator of (3) goes to infinity as k goes to infinity, and so $\delta_T^2(t)$ can become arbitrarily small. To overcome this difficulty, normalized periodicity deviation $\delta_T^2(t)$ can be replaced with $\Delta_T^2(t)$ (e.g., referred to herein as the grey level translation invariant normalized periodicity deviation) in (4):

$$\Delta_T^2(t) = \max_{u(x,y)} \frac{\int_0^T \int_\Omega [I(x, y, t-\tau) - I(x, y, t-\tau-T)]^2 dxdyd\tau}{2\int_0^T \int_\Omega \{[I(x, y, t-\tau) - u(x, y)]^2 + [I(x, y, t-\tau-T) - u(x, y)]^2\}dxdyd\tau} \quad (4)$$

The value of u(x, y) that maximizes (4) is:

$$u(x, y) = \frac{1}{2T}\int_0^{2T} \int_\Omega I(x, y, t-\tau)dxdyd\tau; \quad (5)$$

leading to:

$$\Delta_T^2(t) = \frac{\int_0^T \int_\Omega [I(x, y, t-\tau) - I(x, y, t-\tau-T)]^2 dxdyd\tau}{2\int_0^T \int_\Omega I^2(x, y, t-\tau)dxdyd\tau - \frac{1}{T}\left[2\int_0^T \int_\Omega I(x, y, t-\tau)dxdyd\tau\right]^2} \quad (6)$$

In various embodiments, either periodicity deviation metric (3) or (4), and/or other periodicity deviation metrics, may be used (e.g., as implemented by deviation determination block 414) to measure the periodicity deviation of a video sequence and/or portion of a video sequence, relative to a particular period T, a set of periods T, or a range of periods T. Such period or periods may correspond to a particular type of periodic motion (e.g., biological periodic motion, mechanical periodic motion, gas handling periodic motion), a specific sub-type of periodic motion (e.g., human hand or arm or appendage waving, human vocalization, pet or animal movement, motor rotation, mechanical system harmonic oscillation, relief valve gas exhaust, thermal fluctuations), and/or a specific periodic motion tied to a specific object (e.g., a human hand signal known and designed to request a particular type of aid, a known motor revolution frequency, deviations from which trigger an alarm).

In some embodiments, such period or periods may be identified or preset to correspond to a particular type, sub-type, or specific periodic motion, for example, and may be provided to periodic motion detection block 402 (e.g., as user input or configuration parameters, for example, or as feedback provided by alarm block 502) prior to or with a video sequence to be processed. In other embodiments, such period or periods may be identified and/or adjusted based on characteristics of a received video sequence and/or other parameters, for example, such as the temporal length of the video sequence, dropped frames in the video sequence, a low contrast state of one or more frames of the video sequence, available computation and/or memory resources of controller 110, and/or other video sequence characteristics or parameters, as described herein.

As noted herein, embodiments of periodic motion detection block 402 may be configured to use recursive techniques to implement and apply a selected periodicity deviation metric (e.g., periodicity deviation metric (3) or (4)) efficiently across a received video sequence. In particular, a set of video regions $\Omega_{m,n}$ of video sequence I(x, y, t) (e.g., subsets of pixel region Ω corresponding to the entire frame size of I(x, y, t)) may be defined such that application of the selected metric to I(x, y, t) may be performed recursively to process the entirety or a selected portion of I(x, y, t) relatively quickly and efficiently, sufficiently to be used with embedded systems, such as within infrared imaging module 102b, an infrared camera, and/or within embodiments of imaging system 100 of FIG. 1.

For example, regioning block 412 of FIG. 4 may be implemented by software instructions and/or hardware configured to generate or identify a set of such video regions $\Omega_{m,n}$ of a received video sequence, where the video regions are selected to facilitate recursive application of a periodicity deviation metric to the video sequence. In various embodiments, the video regions may be pixel-wise consistent (e.g., same size and/or position) between successive frames of the received video sequence and/or throughout the temporal length of the video sequence, for example, and may be selected to have positions and/or sizes configured to completely cover each frame of the received video sequence.

In some embodiments, the video regions may be rectangular, circular, or elliptic video regions, for example, with a height, width, radius, or semi-minor axis from as small as 3 or 5 pixels to approximately one half the height or width (or radius or semi-minor axis) of a frame of the received video sequence, or as small as $\frac{1}{20}^{th}$ or $\frac{1}{10}^{th}$ the height or width of a frame of the received video sequence, or as large as the full height or width of a frame of the received video sequence. In particular embodiments, the video regions may be rectangular video regions with a height or width of approximately 10 pixels (e.g., as used herein, the term "rectangular video regions" includes square video regions). In additional embodiments, each video region may at least partially overlap at least one other video region in the set of video regions, for example, and the overlapping video regions may have positions and/or sizes configured to completely cover each frame of the received video sequence.

For example, regioning block 412 may be configured to generate or identify a set of video regions based, at least in part, on the following relation:

$$R_{w,h}[x, y] = [x+1; x+w] \times [y+1; y+h], \begin{cases} 0 \le x \le W-w \\ 0 \le y \le H-h \end{cases}$$

where $R_{w,h}[x, y]$ may represent a rectangle with the left upper corner identified as (x+1, y+1), a width w, and a height h, wherein W and H represent the full width and height of a frame of a received video sequence.

Using such relation, the integrals in (6) may be rewritten to be evaluated within the following $\Omega_{m,n}$ domains/video regions:

$$\Omega_{m,n} = R_{w,h}[x = h_x m, y = h_y n] \begin{cases} 0 \le m \le \dfrac{W-w}{h_x} \\ 0 \le n \le \dfrac{H-h}{h_y} \end{cases}$$

where region parameters $h_x$ and $h_y$ are constants set by user input, configuration parameters, and/or feedback from other operations of preprocessing block 302, periodic motion detection block 402, and/or alarm block 502, for example. In other embodiments, region parameters $h_x$ and $h_y$ may depend on a frame size and/or other characteristic of a received video sequence.

More generally, regioning block 412 may be configured to receive one or more region parameters and a video sequence and/or one or more video sequence characteristics (e.g., a temporal length, a frame height H, a frame width W, and/or other video sequence characteristics) and generate or identify one or more video regions $\Omega_{m,n}$ of a received video sequence. In various embodiments, selection of particular region parameters and/or a size and/or placement of video regions may be adjusted to emphasize performance (e.g., near real-time throughput of a video sequence through periodic motion detection block 402) over exhaustive reliability, such as by limiting the video regions to a sparse coverage or a central portion of a received video sequence. Once such video regions are generated or identified, the video regions may be provided to deviation determination block 414.

Deviation determination block 414 may be implemented by software instructions and/or hardware configured to determine a periodicity deviation (e.g., according to a selected metric) with respect to an identified period or periods and/or one or more video regions of a received video sequence. More generally, deviation determination block 414 may be configured to receive a video sequence and/or corresponding video regions (e.g., generated and/or identified by regioning block 412) and determine at least one periodicity deviation corresponding to at least one video region based, at least in part, on the at least one video region. In some embodiments, the video region(s) may be selected to allow operation of deviation determination block 414 to proceed recursively, as described herein.

For example, using the above construction of $\Omega_{m,n}$, (6) may be discretized as:

$$\Delta_T^2[m, n, t] = \dfrac{D_T[m, n, t]}{2Q_T[m, n, t] - \dfrac{S_T^2[m, n, t]}{T}} \quad (7)$$

with:

$$\begin{cases} D_T[m, n, t] = \sum_{k=1}^{T} \sum_{(x,y) \in \Omega_{m,n}} (I[x, y, t-k] - I[x, y, t-k-T])^2 \\ Q_T[m, n, t] = \sum_{k=1}^{2T} \sum_{(x,y) \in \Omega_{m,n}} I^2[x, y, t-k] \\ S_T[m, n, t] = \sum_{k=1}^{2T} \sum_{(x,y) \in \Omega_{m,n}} I[x, y, t-k] \end{cases} \quad (8)$$

To calculate $D_T[x, y, t]$, $Q_T[x, y, t]$, and $S_T[x, y, t]$ efficiently, the following identity for a generic 2D sequence $\alpha[x, y]$:

$$\sum_{\xi=x+1}^{x+w} \sum_{\eta=y+1}^{y+h} a[\xi, \eta] = \quad (9)$$

$$A[x+w, y+h] + A[x, y] - A[x+w, y] - A[x, y+h]$$

with:

$$A[x, y] = \sum_{\xi=1}^{x} \sum_{\eta=1}^{y} a(x, y)$$

may be used to expand and simplify (8). For example, the quantity $A[x, y]$ can be evaluated efficiently for any x, y by means of the following recursive formula, which comes from (9) for w=1 and h=1:

$$\begin{cases} A[x, y] = a[x, y] + A[x-1, y] + A[x, y-1] - A[x-1, y-1] \\ A[x, 0] = A[0, y] = 0 \end{cases} \quad (10)$$

Once $A[x, y]$ is calculated, the sum in (9) can be calculated in constant time rather than in O(wh). The following shortened notation for the right hand side of (9) may be used, where A is any 2D discrete sequence:

$$\Phi(A, x, y, w, h) = A[x+w, y+h] + A[x, y] + A[x+w, y] - A[x, y+h].$$

Given a three dimensional sequence A[x, y, t], the notation A[t] may be used to indicate a two dimensional sequence derived from A at a fixed instant t. Using this notation, and the identity (9), (8) becomes:

$$\begin{cases} D_{T[m,n,t]} = \sum_{k=1}^{T} \Phi(d_T[t-k], h_x m, h_y n, w, h) \\ Q_{T[m,n,t]} = \sum_{k=1}^{2T} \Phi(q[t-k], h_x m, h_y n, w, h) \\ S_{T[m,n,t]} = \sum_{k=1}^{2T} \Phi(s[t-k], h_x m, h_y n, w, h) \end{cases} \quad (11)$$

With:

$$\begin{cases} d_T[x, y, t] = \sum_{\xi=1}^{x} \sum_{\eta=1}^{y} (I[\xi, \eta, t] - I[\xi, \eta, t-T])^2 \\ q[x, y, t] = \sum_{\xi=1}^{x} \sum_{\eta=1}^{y} I^2(\xi, \eta, t) \\ s[x, y, t] = \sum_{\xi=1}^{x} \sum_{\eta=1}^{y} I(\xi, \eta, t) \end{cases} \quad (12)$$

Using (10), the quantities $d_T[x, y, t]$, $q[x, y, t]$, and $s[x, y, t]$ may be evaluated efficiently as shown in (13):

$$\begin{cases} d_T[x, y, t] = d_T[x-1, y, t] + d_T[x, y, -1, t] - d_T[x-1, y-1, t] + (I[x, y, t] - i[x, y, t-T])^2 \\ q[x, y, t] = q[x-1, y, t] + q[x, y, -1, t] - q[x-1, y-1, t] + I^2[x, y, t] \\ s[x, y, t] = s[x-1, y, t] + s[x, y, -1, t] - s[x-1, y-1, t] + I[x, y, t] \end{cases} \quad (13)$$

The sums over k in (8) may be simplified using the following identity:

$$A[t] = \sum_{k=1}^{T} a[t-k] \Rightarrow A[t+1] = A[t] + a[t] - a[t+T]$$

This results in (14):

$$\begin{cases} D_T[m, n, t+1] = D_T[m, n, t] + \Phi(d_T[t], h_x x, h_y y, w, h) - \Phi(d_T[t-T], h_x x, h_y y, w, h) \\ Q_T[m, n, t+1] = Q_T[m, n, t] + \Phi(q[t], h_x x, h_y y, w, h) - \Phi(q[t-2T], h_x x, h_y y, w, h) \\ S_T[m, n, t+1] = S_T[m, n, t] + \Phi(s[t], h_x x, h_y y, w, h) - \Phi(s[t-2T], h_x x, h_y y, w, h) \end{cases} \quad (14)$$

Thus, as shown above, the calculation of $\Delta_T^2[m, n, t]$ (e.g., referred to herein as the discretized, grey level translation invariant, normalized periodicity deviation for a particular video region $\Omega m, n$) may be performed efficiently (e.g., and recursively) by iterating three steps for each new video sequence (e.g., an added frame or frames to a prior received video sequence). First, update $d_T[x, y, t]$, $q[x, y, t]$, and $s[x, y, t]$ (e.g., which may be referred to generally as the integral image correlation, the squared integral image, and the integral image terms, respectively, or collectively as the sub-region integral image terms) using (13). Second, update $D_T[m, n, t]$, $Q_T[m, n, t]$, and $S_T[m, n, t]$ (e.g., which may be referred to generally as the cumulative integral image correlation, the cumulative squared integral image, and the cumulative integral image terms, respectively, or collectively as the cumulative integral image terms) using (14). Finally, compute the discretized, grey level translation invariant, normalized periodicity deviation $\Delta_T^2[m, n, t]$ using (7).

In some embodiments, deviation determination block 414 may be configured to determine the discretized, grey level translation invariant, normalized periodicity deviation $\Delta_T^2[m, n, t]$ with respect to a single video region, a selection of video regions, or all the video regions associated with a particular received video sequence. More generally, deviation determination block 414 may be configured to determine a periodicity deviation, according to any selected metric, identified period or periods, video region(s), and/or received video sequences. For example, in some embodiments, where the video sequence comprises a plurality of video regions, deviation determination block 414 may be configured to determine a plurality of periodicity deviations corresponding respectively to the plurality of video regions based, at least in part, on the corresponding respective video regions and one or more identified periods or an identified range of periods.

As can be seen from (13) and (14), in some embodiments, in order to determine a periodicity deviation relative to a particular identified period, the temporal length of the received video sequence should be at least twice the identified period, or, conversely, the detectable periodicities may be limited to periods that are approximately half the temporal length of a received video sequence. If a range of periods is identified, such as a continuous range of periods, for example, periodic motion detection block 402 and/or other elements of controller 110 in FIG. 2 may be configured to discretize the range of periods based, at least in part, on a temporal length of a received image sequence and/or other characteristics of a received video sequence.

Other processing block 414 may be implemented by software instructions and/or hardware configured to perform operations separate from other elements of periodic motion detection block 402 to help identify or generate video regions, determine periodicity deviations, provide determined periodicity deviations to alarm block 502, and/or receive feedback and/or other configuration parameters from other elements of controller 110 of FIG. 2 and provide them to elements of periodic motion detection block 402.

In alert block 502 of FIG. 2, a periodicity deviation determined by periodic motion detection block 402 in a video sequence captured in block 202 is used to initiate an alert or trigger other types of responses upon detection of the presence of periodic motion or a particular type of periodic motion in the captured video sequence. For example, FIG. 5 illustrates a block diagram 500 of alert block 502 to issue an alert based on a periodicity deviation in a video sequence, in accordance with an embodiment of the disclosure.

Figure 5:
FIG. 5 illustrates a block diagram of an alert block to issue an alert based on a periodicity deviation in a video sequence, in accordance with an embodiment of the disclosure.
Figure 5:
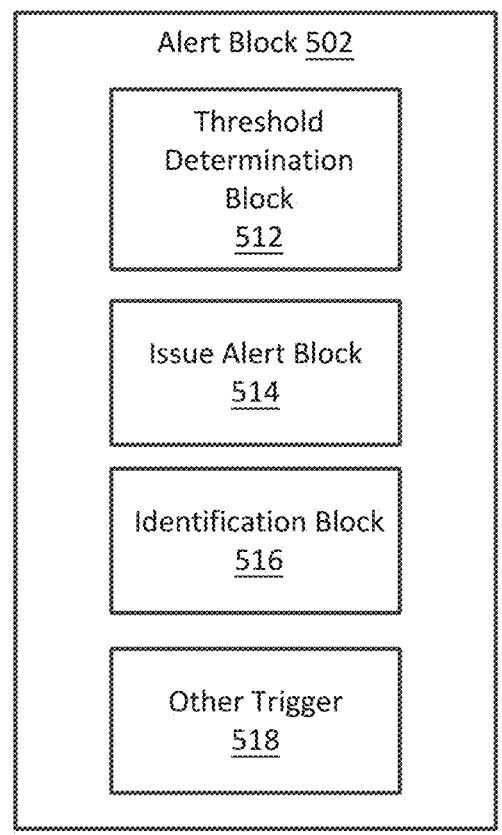

As shown in FIG. 5, alert block 502 may include threshold determination block 512, issue alarm block 514, identification block 516, and/or other trigger block 518.

Threshold determination block 512 may be implemented by software instructions and/or hardware configured to generate or identify one or more periodicity deviation thresholds associated with a type, sub-type, or specific periodic motion for which detection is desired and provide the threshold to issue alarm block 514. For example, threshold determination block 512 may be configured to receive a set of periodicity deviations from periodic motion detection block 402 and determine one or more periodicity determination thresholds based, at least in part, on the received periodicity deviations. In some embodiments, the periodicity determination threshold may be set to be above a certain percentage (e.g., 1%, 5%, 10%, or other percentage) of detected periodicity determinations with respect to a received video sequence including video of a calibration periodic motion. In other embodiments, the periodicity determination threshold may be set according to user selection of a particular type, sub-type, or specific periodic motion for which detection is desired.

In general, a periodicity determination threshold may have a value between 0 and 1 (e.g., the bounds for normalized periodicity deviations), and periodicity deviations below such periodicity determination threshold may be designated sufficiently periodic to constitute a valid detection of a corresponding periodic motion in the received video sequence, with respect to a corresponding period T. Periodicity determination thresholds may be adjustable by user input, configuration parameters, and/or adaptively through statistical feedback, as described herein. For example, periodicity determination thresholds may be adjusted by a feedback loop or other suitable process so as to help reduce or prevent false alarms or to detect broader ranges of periodic motions in the event of accumulation of false negative results (e.g., failed detections of a known particular type, sub-type, or specific periodic motion).

Issue alarm block 514 may be implemented by software instructions and/or hardware configured to issue an alarm or an alert based, at least in part, on one or more determined periodicity deviations provided by periodic motion detection block 402. For example, issue alarm block 514 may be configured to issue and alarm/alert based on a periodicity deviation being below one or more periodicity determination thresholds provided by threshold determination block 512. More generally, issue alarm block 514 may be configured to issue and alarm/alert based, at least in part, on one or more periodicity deviations, one or more identified periods or an identified range of periods, and a periodicity deviation threshold. For example, periodic motion detection block 402 may provide a set of periodicity deviations corresponding to a set of video regions of a video sequence and/or a set of identified periods and issue an alert if any of the received periodicity deviations are less than the received periodicity deviation threshold. More particularly, issue alarm block 514 may be configured to issue an alarm/alert to indicate a presence of a biological periodic motion (e.g., hand, arm, appendage waving and/or other biological periodic motion) in a video sequence.

In various embodiments, issuing an alarm or alert may include, for example, rendering an alert graphic or text or other visual cue on a display, energizing an alarm light or indicator, generating an audible alert sound from an audio transducer or speaker, sending a text message or email to a designated address, generating other sounds or visual cues, and/or otherwise generating and delivering an alert notice to a monitoring user or entity. In some embodiments, the issued alarm or alert may include the received video sequence, a portion of the received video sequence, an indicator of the particular type, sub-type, or specific periodic motion detected, an indicator of the period of the periodic motion, a time, imaging module identification, and/or geographical area associated with the detected periodic motion, and/or other video and/or periodic motion characteristics associated with the detected periodic motion. In embodiments where the issued alert includes a text alert, message, or email, such alert may include a clickable link to at least a frame or other portion of a received video sequence in which the periodic motion was detected.

Identification block 516 may be implemented by software instructions and/or hardware configured to identify the type, sub-type, and/or specific periodic motion causing issue alarm block 514 to issue an alert, for example, and/or to identify one or more portions or video regions of the video sequence in which the periodic motion is detected. For example, identification block 516 may be configured to receive an alert from issue alarm block 514 including a video region or regions (or indications of the region or regions) of a video sequence in which a corresponding periodicity deviation was below a periodicity deviation threshold, and to render that region or regions of the video sequence on a display (e.g., which may be highlighted, outlined, or otherwise differentiated from the remaining portions of the video sequence as containing the detected periodic motion), to render a still frame including at least a portion of that region or regions, to render corresponding segments of the video sequence, or render other video or images configured to identify a portion of the video sequence depicting the detected periodic motion. In other embodiments, identification block 516 may be configured to cross reference a period of the detected periodic motion to a library of periodic motions to identify the type, sub-type, or specific periodic motion. Identification block 516 may also be configured to use such identification of the periodic motion to help localize structure within the video sequence likely to generate the identified periodic motion.

Other trigger block 518 may be implemented by software instructions and/or hardware configured to perform operations separate from other elements of alert block 502 to help detect periodic motion, determine periodicity deviation thresholds, issue alerts, identify types of periodic motion, localize detected periodic motion within a video sequence, and/or transmit feedback, other configuration parameters, and/or other alerts or data between other elements of controller 110 of FIG. 2 and alert block 502.

Figure 8:
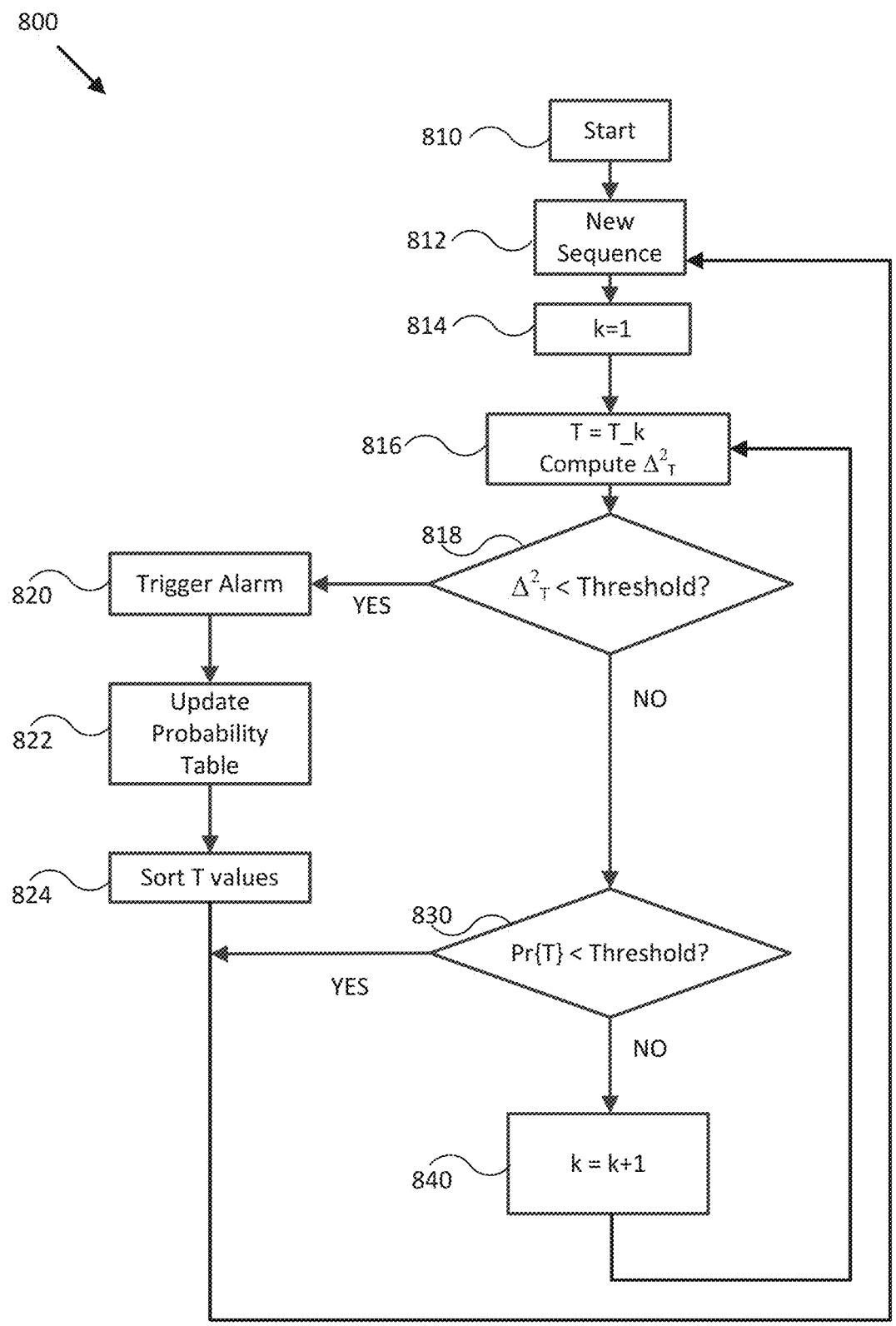
FIG. 8 illustrates a flow diagram of a process to provide periodic motion detection, in accordance with an embodiment of the disclosure.

FIG. 8 illustrates a flow diagram of a process 800 to provide periodic motion detection, in accordance with an embodiment of the disclosure. In some embodiments, the operations of FIG. 8 may be implemented as software instructions executed by one or more logic devices associated with corresponding electronic devices, sensors, and/or structures depicted in FIGS. 1-5. More generally, the operations of FIG. 8 may be implemented by any combination of software instructions and/or electronic hardware (e.g., inductors, capacitors, amplifiers, actuators, or other analog and/or digital components).

It should be appreciated that any step, sub-step, sub-process, or block of process 800 may be performed in an order or arrangement different from the embodiments illustrated by FIG. 8. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 800 is described with reference to systems and elements of FIGS. 1-5, process 800 may be performed by other systems different from those systems and including a different selection of electronic devices, sensors, assemblies, and/or component attributes. At the initiation of process 800, various system parameters may be populated by prior execution of a process similar to process 800, for example, or may be initialized to zero and/or one or more values corresponding to typical, stored, and/or learned values derived from past operation of process 800, as described herein.

To detect periodicity with a period T that is not previously known or targeted, embodiments of the present disclosure may be configured to determine periodicity over several values of T within an appropriately defined range. In some embodiments, to increase a detection speed, an alert may be issued (e.g., by alert block 502) immediately upon detecting a periodicity deviation below an identified periodicity deviation threshold, for a particular period, rather than exhaustively determining periodicity deviations for all possible periods. FIG. 8 illustrates such an embodiment. Moreover, subsequent execution of process 800 may advantageously use an ordered probability table, updated according to successful periodic motion detections, to further increase periodic motion detection performance by adaptively reducing the range of likely values for period T after each successful periodic motion detection.

Prior to execution of process 800, a set of N different periods $T_1, \ldots T_N$ and a corresponding probability table $Pr\{T_k\}$ associated with a periodic motion (e.g., hand or arm waving) selected for detection are identified or determined, such as by factory-provided configuration parameters and/or by calibration and/or statistical analysis performed offline (e.g., prior to execution of process 800 for the first time) with respect to periodic motion detection of known motions in a video sequence, as described herein. As used herein, each element of probability table $Pr\{T_k\}$ represents a probability that the selected periodic motion appears with period $\{T_k\}$ in a video sequence if the periodic motion is present in the video sequence. In various embodiments, the values of $\{T_k\}$ may be sorted (e.g., in descending order of probability) so that the most likely periods can be tested first, in an iterative loop from most likely to least likely.

The iterative loop, as shown in FIG. 8, continues until a determined periodicity deviation is below the appropriate periodicity deviation threshold or the probability of the tested period falls below a corresponding probability threshold, after which the video sequence is updated (e.g., with a new frame, frames, or video sequence) and process 800 repeats. If a determined periodicity deviation is below the appropriate periodicity deviation threshold, the probability table is updated by increasing the probability of the corresponding tested period and by decreasing the probabilities of the other periods in the probability table. As such, iterative execution of process 800 adaptively reorders the probability table to test the most-likely-successful periods first, as affirmed by successful detections of the selected periodic motion at the most probable periods, and thus can significantly reduce computation time in successive executions of process 800.

In block 810, execution of process 800 is initiated. For example, controller 110 may be configured to receive user input indicating periodic motion detection in a video stream should begin. In block 812, a new video sequence is received. For example, controller 110 may be configured to receive a new video sequence, frame, or frames from imaging modules 102a and/or 102b. In block 814, iteration parameter k is set to 1. In block 816, a periodicity deviation relative to a most probable period T (e.g., k=1) is determined. For example, controller 110 (e.g., blocks 302, and/or 402 of FIGS. 2-4) may be configured to determine a periodicity deviation relative to the most probable period T and provide the periodicity deviation to block 818. In block 818, the periodicity deviation is compared to a periodicity deviation threshold (e.g., provided by threshold determination block 512). For example, controller 110 (e.g., block 502) may be configured to generate or identify an appropriate periodicity deviation threshold and compare it to the periodicity deviation provided by block 816.

In block 820, an alarm or alert is triggered. For example, controller 110 (e.g., block 502) may be configured to issue an alert or alarm, as described herein, based on the periodicity deviation provided by block 816 being less than an appropriate periodicity deviation threshold, as tested in block 818. In block 822, a probability table is updated. For example, controller 110 (e.g., blocks 502 and/or 518 of FIG. 5) may be configured to update a probability table by increasing the probability of the corresponding successfully tested period and by decreasing one or more of the probabilities of the other (unsuccessful and/or untested) periods in the probability table. The increase and decrease amounts may be based on a percentage of the prior probability value (e.g., 1, 5, or 10%), on a distribution characteristic (e.g., standard deviation, mean, median) of the probabilities, a constant value (e.g., a constant in the range of 0.01 to 0.1), on each other (e.g., such that the sum of the probabilities in the probability table is the same before and after the update), and/or on user input or other configuration parameters. In embodiments where the selected periodic motion is a biological periodic motion (e.g., hand, arm, appendage waving), the probability table may be associated with a set of identified periods corresponding to the biological periodic motion and the biological periodic motion itself, and the probability table may include one or more probabilities associated with corresponding identified periods and the biological periodic motion.

In block 824, the probability table is resorted. For example, controller 110 (e.g., blocks 502 and/or 518 of FIG. 5) may be configured to resort or reorder the probability table based on the updated probabilities determined in block 822, to test the most-likely-successful periods first in subsequent executions of process 800, and thus significantly reduce computation time in successive executions of process 800, when detecting the selected periodic motion. Upon completion of execution of block 824, process 800 proceeds back to block 812, which receives a new video sequence (e.g., new frame, frames, or video sequence) for testing by operation of a further iteration of process 800.

In block 830, a probability corresponding to the tested period T is compared to a probability threshold (e.g., provided by other trigger block 518). For example, controller 110 (e.g., block 502 and/or 518 of FIG. 5) may be configured to generate or identify an appropriate probability threshold (e.g., similar to a periodicity deviation threshold) and compare it to the probability of the tested period T as set by blocks 814 and 816. Upon determination that the probability of the tested period T is less than the appropriate probability threshold, process 800 proceeds back to block 812, which receives a new video sequence (e.g., new frame, frames, or video sequence) for testing by operation of a further iteration of process 800. Upon determination that the probability of the tested period T is greater than or equal to than the appropriate probability threshold, process 800 proceeds to block 840. In block 840, iteration parameter k is incremented. Upon completion of execution of block 840, process 800 proceeds back to block 816, which identifies the next most likely period T and determines a corresponding periodicity deviation for testing by operation of a further iteration of blocks 818, 820-824, 830, and/or 840 of process 800.

In one embodiment, where the selected periodic motion comprises a biological periodic motion, iteration of process 800 may include determining a first periodicity deviation corresponding to a first identified period is greater than or equal to a periodicity deviation threshold corresponding to the biological periodic motion (e.g., blocks 814, 816, 818); determining a first probability associated with the first identified period and the biological periodic motion is greater than a probability threshold associated with the biological periodic motion (e.g., block 830); determining a second periodicity deviation corresponding to a second identified period is less than the periodicity deviation threshold corresponding to the biological periodic motion (e.g., blocks 840, 816, and 818; and issuing an alert based, at least in part, on the second periodicity deviation, to indicate a presence of the biological periodic motion in the video sequence (e.g., block 820).

Thus, embodiments provide relatively efficient and high performance periodic motion detection in video streams, as described herein. Such embodiments may increase the general safety of a monitored person or area and the general responsiveness of a monitoring person or entity. For example, when a person waves their arms in distress, embodiments may be configured to detect such motion more quickly and reliably than conventional monitoring systems, thus allowing monitoring services to render aid more quickly to the distressed person.

Figure 9:
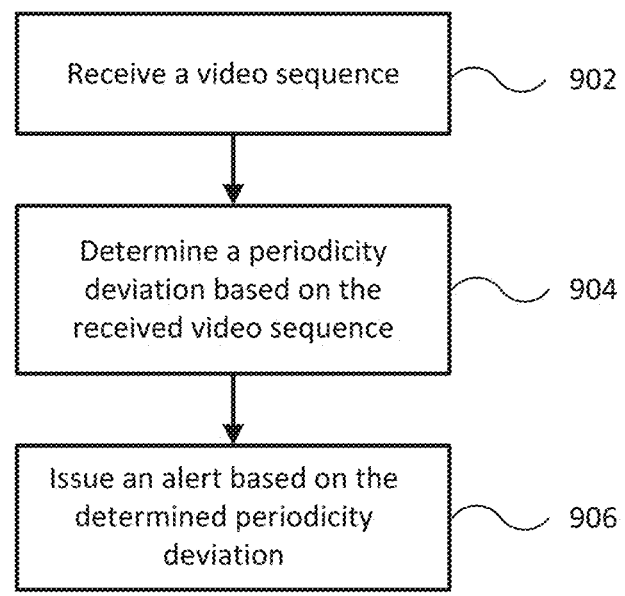
FIG. 9 illustrates a flow diagram of a process to provide periodic motion detection, in accordance with an embodiment of the disclosure.

FIG. 9 illustrates a flow diagram of process 900 to provide periodic motion detection in a video sequence, in accordance with embodiments of the disclosure. In some embodiments, the operations of FIG. 9 may be implemented as software instructions executed by one or more logic devices associated with corresponding electronic devices, sensors, and/or structures depicted in FIGS. 1-5. More generally, the operations of FIG. 9 may be implemented by any combination of software instructions and/or electronic hardware (e.g., inductors, capacitors, amplifiers, actuators, or other analog and/or digital components).

It should be appreciated that any step, sub-step, sub-process, or block of process 900 may be performed in an order or arrangement different from the embodiments illustrated by FIG. 9. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 900 is described with reference to systems and elements of FIGS. 1-5, process 900 may be performed by other systems different from those systems and including a different selection of electronic devices, sensors, assemblies, and/or component attributes. At the initiation of process 900, various system parameters may be populated by prior execution of a process similar to process 900, for example, or may be initialized to zero and/or one or more values corresponding to typical, stored, and/or learned values derived from past operation of process 900, as described herein.

In block 902, a logic device receives a video sequence. For example, controller 110 of system 100 may be configured to receive a visible spectrum and/or infrared video sequence (e.g., image data) from corresponding imaging modules 102*a* and/or 102*b*. In some embodiments, the received video sequence may include one or more video regions that are pixel-wise consistent (e.g., spatially sized and/or placed within frames) between successive frames of the received video sequence. In some embodiments, the video regions may include a plurality of rectangular video regions, each video region may at least partially overlap at least one other video region, each video region may include a height or width or radius or semi-minor axis between 5 pixels and one half a corresponding full height or width of a frame of the received video sequence, and/or the overlapping rectangular video regions may include a corresponding plurality of positions and/or sizes configured to completely cover each frame of the received video sequence.

In various embodiments, controller 110 may be configured to perform various preprocessing operations on the video sequence prior to proceeding to block 904. For example, controller 110 may be configured to de-trend the received video sequence by determining a spatial average of the received video sequence and de-trending the received video sequence by subtracting the determined spatial average from each frame of the received video sequence, prior to determining a periodicity deviation. Controller 110 may be configured to alternatively or additionally apply a low pass filter to the received video sequence, prior to determining a periodicity deviation. In some embodiments, the low pass filter includes a linear low pass filter, and in further embodiments, the low pass filter may be implemented by a separable two dimensional Bernoulli filter, as described herein.

In block 904, a logic device determines a periodicity deviation based on a received video sequence. For example, controller 110 may be configured to determine a periodicity deviation based, at least in part, on the video sequence received in block 902. In embodiments where the video sequence includes one or more video regions, controller 110 may be configured to determine the periodicity deviation with respect to at least one of the video regions based, at least in part, on the at least one video region.

In some embodiments, controller 110 may be configured to determine a discretized, grey level translation invariant, normalized periodicity deviation corresponding to the at least one video region based, at least in part, on the at least one video region and an identified period, as described herein. In other embodiments, where the one or more video regions include a plurality of video regions, and the at least one periodicity deviation includes a plurality of periodicity deviations corresponding respectively to the plurality of video regions, controller 110 may be configured to determine the plurality of periodicity deviations corresponding respectively to the plurality of video regions based, at least in part, on the corresponding respective video regions and one or more identified periods or an identified range of periods, for example.

In further embodiments, (e.g., similar to process 800), controller 110 may be configured to determine a first periodicity deviation corresponding to a first identified period is greater than or equal to a periodicity deviation threshold corresponding to a periodic motion, determine a first probability associated with the first identified period and the periodic motion is greater than a probability threshold associated with the periodic motion, and determine a second periodicity deviation corresponding to a second identified period is less than the periodicity deviation threshold corresponding to the periodic motion.

In block 906, a logic device issues an alert based on a determined periodicity deviation. For example, controller 110 may be configured to issue an alert based on the periodicity deviation determined in block 904. In some embodiments, controller 110 may be configured to issue the alert based, at least in part, on a determined plurality of periodicity deviations, one or more identified periods or an identified range of periods, and a periodicity deviation threshold. In other embodiments (e.g., similar to process 800), controller 110 may be configured to issue the alert based, at least in part, on a second periodicity deviation, to indicate a presence of a periodic motion in the video sequence.

In further embodiments, controller 110 may be configured to perform additional operations before proceeding to other operations and/or iterating a periodic motion detection process. For example, controller 110 may be configured to update a probability table associated with a set of identified periods and a periodic motion, where the set of identified periods includes at least first and second identified periods, the probability table comprises at least a first probability associated with the first identified period and the periodic motion and a second probability associated with the second identified period and the periodic motion, and the updating the probability table includes increasing the second probability and decreasing at least the first probability in the probability table.

It is contemplated that any one or combination of methods to provide periodic motion detection may be performed according to one or more operating contexts of a control loop, for example, such as a startup, learning, running, and/or other type operating context. For example, process 800 may proceed back to block 810 or process 900 may proceed back to block 902 and proceed through their respective process 800 or 900 again, with an updated or newly acquired video sequence, for example, to produce updated periodicity deviations and/or corresponding monitoring information, as in a control loop.

Embodiments of the present disclosure can thus provide reliable detection of periodic motion in video sequences. Such embodiments may be used to detect biological periodic motion, mechanical periodic motion, gas handling periodic motion, and/or other types of periodic motion, and to reliably differentiate different types of periodic motion based, at least in part, on relative ranges of periodicity and/or other characteristics of the detection periodic motion, as described herein. Moreover, such embodiments may be implemented relatively efficiently so as to be suitable for embedded systems applications where computing and memory resources are relatively limited.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

I claim:

1. A system comprising:
an imaging module configured to capture video of a scene; and
a logic device configured to communicate with the imaging module, wherein the logic device is configured to:
receive a video sequence of the scene from the imaging module, wherein the received video sequence comprises a sequence of frames and comprises one or more video regions that are present in each frame and are pixel-wise consistent between successive frames of the received video sequence;
determine at least one periodicity deviation corresponding to at least one of the one or more video regions based, at least in part, on a periodicity deviation of an image at each of a plurality of pixels in the at least one video region, wherein the periodicity deviation corresponding to at least one of the one or more video regions measures a deviation of the video sequence from being T-periodic for a preselected period T; and
issue an alert based, at least in part, on the determined at least one periodicity deviation.

2. The system of claim 1, wherein the logic device is configured to:
determine a spatial average of the received video sequence; and
de-trend the received video sequence by subtracting the determined spatial average from each frame of the received video sequence, prior to the determining the periodicity deviation;
wherein the periodicity deviation of an image at each of a plurality of pixels is based, at least in part, on a change of the image at each of the plurality of pixels between a first time and a corresponding second time preceding the first time by the preselected period T as the first time varies at least within an interval equal to the preselected period T.

3. The system of claim 1, wherein the logic device is configured to:
apply a low pass filter to the received video sequence, prior to the determining the periodicity deviation.

4. The system of claim 3, wherein:
the low pass filter comprises a linear low pass filter; and
the linear low pass filter is implemented by a separable two dimensional Bernoulli filter.

5. The system of claim 1, wherein:
the one or more video regions comprise a plurality of rectangular video regions;

each rectangular video region at least partially overlaps at least one other rectangular video region; and each rectangular video region comprises a height or width between 5 pixels and one half a corresponding full height or width of a frame of the received video sequence.

6. The system of claim 1, wherein:

the one or more video regions comprise a plurality of overlapping rectangular video regions; and the plurality of overlapping rectangular video regions comprises a corresponding plurality of positions and/or sizes configured to completely cover each frame of the received video sequence.

7. The system of claim 1, wherein:

the determining the periodicity deviation comprises determining a discretized, grey level translation invariant, normalized periodicity deviation corresponding to the at least one video region based, at least in part, on the at least one video region and the preselected period T; and the temporal length of the received video sequence is at least twice the preselected period T.

8. The system of claim 1, wherein the one or more video regions comprise a plurality of video regions, the at least one periodicity deviation corresponding to the at least one of the one or more video regions comprises a plurality of periodicity deviations corresponding respectively to the plurality of video regions, and the logic device is configured to:

determine the plurality of periodicity deviations corresponding respectively to the plurality of video regions based, at least in part, on the corresponding respective video regions and one or more preselected periods including the preselected period T or a preselected range of periods including the preselected period T; and issue the alert based, at least in part, on the determined plurality of periodicity deviations, the one or more preselected periods or the preselected range of periods, and a periodicity deviation threshold.

9. A method comprising:

receiving a video sequence of a scene from an imaging module, wherein the received video sequence comprises a sequence of frames and comprises one or more video regions that are present in each frame and are pixel-wise consistent between successive frames of the received video sequence;

determining a periodicity deviation with respect to at least one of the one or more video regions based, at least in part, on a periodicity deviation of an image at each of a plurality of pixels in the at least one video region, wherein the periodicity deviation corresponding to at least one of the one or more video regions measures a deviation of the video sequence from being T-periodic for a preselected period T; and issuing an alert based, at least in part, on the determined periodicity deviation.

10. The method of claim 9, further comprising:

determining a spatial average of the received video sequence; and de-trending the received video sequence by subtracting the determined spatial average from each frame of the received video sequence, prior to the determining the periodicity deviation;

wherein the periodicity deviation of an image at each of a plurality of pixels is based, at least in part, on a change of the image at each of the plurality of pixels between a first time and a corresponding second time preceding the first time by the preselected period T as the first time varies at least within an interval equal to the preselected period T.

11. The method of claim 9, further comprising:

applying a low pass filter to the received video sequence, prior to the determining the periodicity deviation.

12. The method of claim 11, wherein:

the low pass filter comprises a linear low pass filter; and the linear low pass filter is implemented by a separable two dimensional Bernoulli filter.

13. The method of claim 9, wherein:

the one or more video regions comprise a plurality of rectangular video regions;

each rectangular video region at least partially overlaps at least one other rectangular video region; and each rectangular video region comprises a height or width between 5 pixels and one half a corresponding full height or width of a frame of the received video sequence.

14. The method of claim 9, wherein:

the one or more video regions comprise a plurality of rectangular video regions; and the plurality of rectangular video regions comprises a corresponding plurality of positions and/or sizes configured to completely cover each frame of the received video sequence.

15. The method of claim 9, wherein:

the determining the periodicity deviation comprises determining a discretized, translation invariant, normalized periodicity deviation corresponding to the at least one video region based, at least in part, on the at least one video region and the preselected period T; and the temporal length of the received video sequence is at least twice the preselected period T.

16. The method of claim 9, wherein the one or more video regions comprise a plurality of video regions and the at least one periodicity deviation corresponding to the at least one of the one or more video regions comprises a plurality of periodicity deviations corresponding respectively to the plurality of video regions, the method further comprising:

determining the plurality of periodicity deviations corresponding respectively to the plurality of video regions based, at least in part, on the corresponding respective video regions and one or more preselected periods including the preselected period T or a preselected range of periods including the preselected period T; and issuing the alert based, at least in part, on the determined plurality of periodicity deviations, the one or more preselected periods or the preselected range of periods, and a periodicity deviation threshold.

17. A method comprising:

receiving a video sequence of a scene from an imaging module, wherein the received video sequence comprises one or more video regions that are pixel-wise consistent between successive frames of the received video sequence;

determining a periodicity deviation with respect to at least one of the one or more video regions based, at least in part, on the at least one video region; and issuing an alert based, at least in part, on the determined periodicity deviation;

wherein the at least one periodicity deviation comprises first and second periodicity deviations corresponding to respective first and second identified periods associated with a biological periodic motion, the method further comprising:

determining the first periodicity deviation corresponding to the first identified period is greater than or equal to a periodicity deviation threshold corresponding to the biological periodic motion;

determining a first probability associated with the first identified period and the biological periodic motion is greater than a probability threshold associated with the biological periodic motion;

determining the second periodicity deviation corresponding to the second identified period is less than the periodicity deviation threshold corresponding to the biological periodic motion; and issuing the alert based, at least in part, on the second periodicity deviation, to indicate a presence of the biological periodic motion in the video sequence.

18. The method of claim 17, wherein:

the method comprises updating a probability table associated with a set of identified periods and the biological periodic motion;

the set of identified periods comprises at least the first and second identified periods;

the probability table comprises at least the first probability associated with the first identified period and the biological periodic motion and a second probability associated with the second identified period and the biological periodic motion; and the updating the probability table comprises increasing the second probability and decreasing at least the first probability in the probability table.

19. A system comprising:

an imaging module configured to capture video of a scene; and a logic device configured to communicate with the imaging module, wherein the logic device is configured to perform the method of claim 17.

20. The system of claim 19, wherein:

the logic device is configured to update a probability table associated with a set of identified periods and the biological periodic motion;

the set of identified periods comprises the first and second identified periods;

the probability table comprises at least the first probability associated with the first identified period and the biological periodic motion and a second probability associated with the second identified period and the biological periodic motion; and the updating the probability table comprises increasing the second probability and decreasing at least the first probability in the probability table.

* * * * *